(12) United States Patent
Neystadt et al.

(10) Patent No.: US 7,926,114 B2
(45) Date of Patent: Apr. 12, 2011

(54) TESTING SOFTWARE APPLICATIONS WITH SCHEMA-BASED FUZZING

(75) Inventors: John Neystadt, Kfar-Saba (IL); Nissim Natanov, Haifa (IL)

(73) Assignee: Microsoft Corporation, Redmond, WA (US)

( * ) Notice: Subject to any disclaimer, the term of this patent is extended or adjusted under 35 U.S.C. 154(b) by 967 days.

(21) Appl. No.: 11/756,150

(22) Filed: May 31, 2007

(65) Prior Publication Data

US 2008/0301813 A1 Dec. 4, 2008

(51) Int. Cl.
*G06F 11/00* (2006.01)
(52) U.S. Cl. .............................. 726/25; 726/22; 726/23
(58) Field of Classification Search .................. 726/25, 726/23, 22
See application file for complete search history.

(56) References Cited

U.S. PATENT DOCUMENTS

| | | |
|---|---|---|
| 6,282,526 B1 | 8/2001 | Ganesh |
| 6,530,039 B1 | 3/2003 | Yang |
| 6,701,460 B1 | 3/2004 | Suwandi et al. |
| 6,889,158 B2 | 5/2005 | Penov et al. |
| 6,973,560 B1 | 12/2005 | Rice et al. |
| 7,035,770 B2 | 4/2006 | Lin et al. |
| 2004/0128530 A1 | 7/2004 | Isenberg |
| 2005/0044451 A1 | 2/2005 | Fry et al. |
| 2005/0273860 A1 | 12/2005 | Chess et al. |

OTHER PUBLICATIONS

Tag-Aware Text File Fuzz Testing for Security of a Software System; YoungHan Choi; HyoungChun Kim; DoHoon Lee; Convergence Information Technology, 2007. International Conference on; Publication Year: 2007, pp. 2254-2259.*
A Model-Based Fuzz Framework to the Security Testing of TCG Software Stack Implementations; Yang Yang; Huanguo Zhang; Mi Pan; Jian Yang; Fan He; Zhide Li; Multimedia Information Networking and Security, 2009. MINES '09. International Conference on; vol. 1; Publication Year: 2009, pp. 14.*
An Empirical Study for Security of Windows DLL Files Using Automated API Fuzz Testing; YoungHan Choi; HyoungChun Kim; DoHoon Lee; Advanced Communication Technology, 2008. ICACT 2008. 10th International Conference on vol. 2; Publication Year: 2008, pp. 1473-1475.*
Bastani, et al., "Experimental Evaluation of a Fuzzy-Set Based Measure of Software Correctness", retrieved at <<http://delivery.acm.org/10.1145/260000/257591/p45-bastani.pdf? key1=257591&key2=4148965511&coll=portal&dl=ACM&CFID=15151515&CFTOKEN=6184618>>, IEEE, 1993, pp. 45-54.
Hao, et al., "A Similarity-Aware Approach to Testing Based Fault Localization", retrieved at <<http://delivery.acm.org/10.1145/1110000/1101953/p291-hao.pdf? key1=1101953&key2=1462075511&coll=GUIDE&dl=GUIDE&CFID=1411144&CFTOKEN=64269402>>, ASE'05, Nov. 7-11, 2005, ACM, 2005, pp. 291-294. Last, et al., "The Data Mining Approach to Automated Software Testing", retrieved at <<http://delivery.acm.org/10.1145/960000/956795/p388-last pdf? key1 =956795&key2=0361555511&coll=GUIDE&dl=GUIDE&CFID=3458448&CFTOKEN=89032805>>, SIGKDD'03, Aug. 24-27, 2003, ACM, 2003, pp. 388-396.
Oehlert, "Violating Assumptions with Fuzzing", retrieved at <<http://ieeexplore.ieee.org/iel5/8013/30742/01423963.pdf?isNumber=>>, IEEE Computer Society, Mar./Apr. 2005, pp. 58-62.

* cited by examiner

*Primary Examiner* — David Y Jung
(74) *Attorney, Agent, or Firm* — Lee & Hayes, PLLC

(57) ABSTRACT

Systems and methods to test software applications with schema-based fuzzing are described. In one aspect, the systems and methods automatically generate valid input data for a software application according to a fuzzing data schema. The fuzzing data schema describes characteristics of data format that would be proper or well formed for input into the software application. The systems and methods mutate to the valid input data with one or more fuzzing algorithms to generate corrupted versions, or malformed data. The malformed data is for fuzz testing the software application to identify any security vulnerabilities.

19 Claims, 3 Drawing Sheets

TESTING SOFTWARE APPLICATIONS WITH SCHEMA-BASED FUZZING

BACKGROUND

To avoid certain types of security vulnerabilities, computer-program applications should verify that consumed input is well-formed, without making false assumptions about input consistency. Otherwise, security vulnerabilities such as buffer overruns resulting from malformed input and other types of errors may be fatal to proper functioning and results of the application. To locate any such vulnerabilities, software developers often implement "fuzz testing", or "fuzzing" prior to releasing software. Fuzzing is a software testing technique that typically provides random data ("fuzz") as computer-program application data inputs. If the application fails in view of such randomly generated data inputs, for example, by crashing, or by failing built-in code assertions, a software developer generally notes and attempts to address the defects. However, conventional software fuzz testing techniques are typically very time consuming and labor intensive, often requiring iterative manual effort and/or use of inefficient automated techniques. For instance, existing fuzzing techniques generally only locate very specific and simple faults, often with poor code coverage. For example, if input includes a checksum which is not properly updated to match other random changes, only the checksum validation code will be verified. Every fuzzer is generally designed to find a different set of vulnerabilities, or bugs.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

Systems and methods to test software applications with schema-based fuzzing are described. In one aspect, the systems and methods automatically generate valid input data for a software application according to a fuzzing data schema. The fuzzing data schema describes format of data that would be proper or well formed for input into the software application. The systems and methods mutate the valid input data with one or more fuzzing algorithms to generate corrupted versions, or malformed data. The malformed data is for fuzz testing the software application to identify any security vulnerabilities.

BRIEF DESCRIPTION OF THE DRAWINGS

In the Figures, the left-most digit of a component reference number identifies the particular Figure in which the component first appears.

DETAILED DESCRIPTION

Overview

Figure 1:
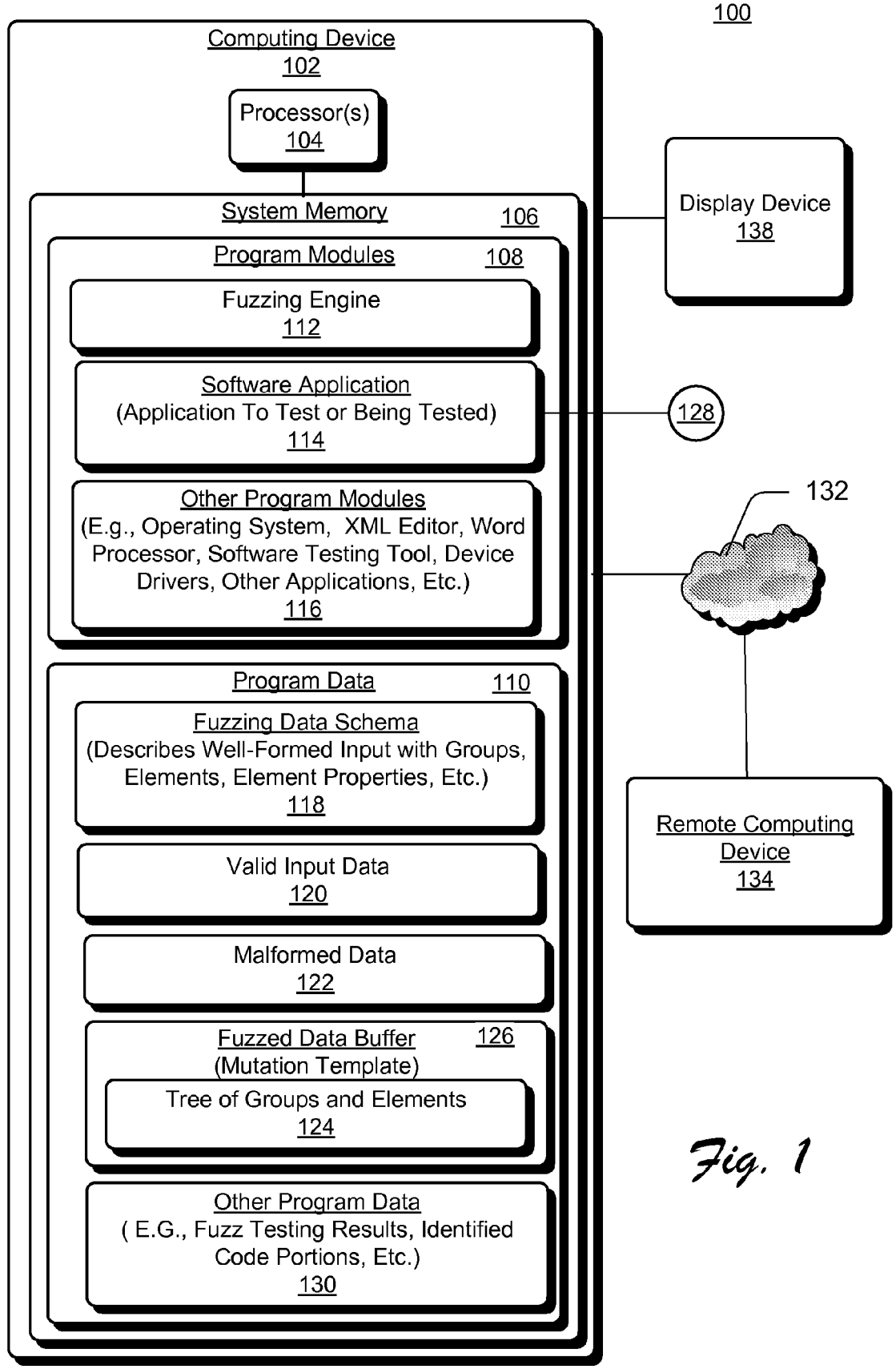
FIG. 1 shows an exemplary system for testing software applications with schema-based fuzzing, according to one embodiment.

Conventional software fuzzing techniques include, for example, manual code reviews and inspections, manual testing of negative test cases, automated static code analysis, and automated dumb fuzzing by randomly corrupting bits in the input data. These techniques are substantially limited. For example, manual code reviews and inspections are typically very time consuming and error prone. One reason for this is that complicated dependencies and assumptions are difficult to identify manually. Another reason for this is that manual code reviews may introduce new bugs due to false positives. Additionally, testing of negative test cases generally requires manual definition of a test case for every input. Enumerating all combinations of data formats for complex inputs is typically a very time consuming and difficult (often-insurmountable) task. In another example, automated static code analysis techniques typically locate only specific and very simple bugs. One reason for this is that such automated techniques are typically not aware of input structure. Moreover, due to high processing costs of evaluating all possible code paths, automated static code analysis techniques commonly have limited code path coverage. Furthermore, existing automated dumb fuzzing, which randomly corrupts input bits, often results in missed bugs. One reason for this is that conventional automated dumb fuzzing techniques cannot correctly adjust the length or count fields with the input data.

Systems and methods to test software applications with schema-based fuzzing to identify security vulnerabilities are described below with respect to FIGS. 1 through 3. The systems and methods, each of which is at least partially implemented by a computing device, use a fuzzing data schema to describe aspects and structure of valid (well-formed) input to a computer-program application ("application"). In one implementation, for example, the fuzzing data schema is an XML schema. The systems and methods parse the schema to identify input structure and automatically determine and generate all permutations of malformed input to the application. In this manner, the generated malformed input is not randomly generated in a manner that could miss a particular permutation, but rather systematically generated in view of specific data characteristics parsed from the schema. For purposes of exemplary description, such "malformed input" is also hereinafter often referred to as "malformed data." The malformed data determinations are made independent of whether input data field length changes because the systems and methods vary field length responsive to such changes. To identify security vulnerabilities in the application, the systems and methods input the systematically generated malformed data into the application to identifying security vulnerabilities without false positives (i.e., every bug identified is real and exploitable). In at least these manners, the systems and methods to test software applications with schema-based fuzzing address the limitations of conventional software fuzzing techniques.

These and other aspects of the systems and methods for testing software applications with schema-based fuzzing are now described in greater detail

An Exemplary System

Although not required, the systems and methods to test software applications are described in the general context of computer-program instructions being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 shows an exemplary system 100 to test software with schema-based fuzzing, according to one embodiment. In this implementation, system 100 includes computing device 102. Computing device 102 represents, for example a general purpose computing device, a server, a laptop, a mobile computing device, and/or so on, that accepts information in digital or similar form and manipulates it for a specific result based upon a sequence of instructions. To this end, computing device 102 includes one or more processors 104 coupled to a tangible computer-readable data storage medium such as a system memory 106. System memory 106 includes, for example, volatile random access memory (e.g., RAM) and non-volatile read-only memory (e.g., ROM, flash memory, etc.). Processor 104 may be a microprocessor, microcomputer, microcontroller, digital signal processor, etc.

System memory 106 includes program modules 108. Each program module 108 is a computer-program application including computer-program instructions executable by processor 104. System memory 106 also includes program data 110 that is generated and/or used by respective ones of the program modules 108. In this implementation, for example, program modules 108 include fuzz-testing ("fuzzing") engine 112, software application 114, and "other program modules" 116 such as an Operating System (OS) to provide a runtime environment, an XML editor, a testing tool, device drivers, etc. In one implementation, fuzzing engine 112 tests software application 114 with schema-based fuzzing to identify security vulnerabilities. Before describing exactly how fuzzing engine 112 perform such operations, we first describe aspects of fuzzing data schema 118.

Modeling Well-Formed (Valid) Input Data for a Software Application

In one implementation, a software developer or other user manually defines fuzzing data schema 118. For example, a user interfaces with an Extensible Markup Language (XML) editing application to generate fuzzing data schema 118. Although fuzzing data schema 118 is shown as local to computing device 102, in another implementation, fuzzing data schema 118 is remote from computing device 102 (e.g., in a database coupled to computing device 102 over a network, etc.). Fuzzing data schema 118 describes/models characteristics (e.g., data types, attributes, relationships, input sequences, etc.) of well-formed valid input data (e.g., input data, message protocol formats, etc.) for software application 114. This data modeling does not directly provide specific instances of well-formed data, but rather describes attributes, characteristics, etc. that a specific instance of well-formed data would have. Software application 114 can be any arbitrary application. For instance, valid input data to a web browser software application 114 includes, for example, HTTP protocol response message to present HTML web pages. In another example, valid input data to a SMTP server software application 114 include data to present SMTP-based messages. In either of these exemplary scenarios, the user models corresponding protocols (e.g., HTTP, HTML, SMTP, and/or so on), including each specific form of the protocol. Examples of valid input data modeling for fuzzing data schema 118 are presented below.

To model valid (well-formed) input data for software application 114, a user decomposes the input data into atomic groups of groups of elements or primitive elements (strings, numbers, etc.). For each element, the fuzzing data schema 118 indicates data type, valid values or relationships (e.g., attributes describing legitimate variations of the element such as data length, valid ranges, minimum/maximum values, and/or so on). Such relationships/attributes/valid formats indicate appropriate value(s) of an element for well-formed (i.e., expected) input into the software application. For variable length fields, fuzzing data schema 118 indicates how to detect field termination (e.g., by whitespace or carriage return character, etc.). TABLES 1 and 2 respectively show an exemplary set of elements (data fields and attributes) and groups of elements or groups (e.g., a group of groups) to model well-formed input data for software application 114. Although a certain number of elements and groups are described with respect TABLES 1 and 2, it can be appreciated that system 100 can use other elements and groups to model well-formed input data for software application 114.

TABLE 1

EXEMPLARY ELEMENTS TO DESCRIBE WELL-FORMED INPUT

| Name | Purpose |
|---|---|
| Character String | String with ASCII or Unicode characters of variable length. In this implementation, length is fixed or determined by specified terminator. In one implementation, a valid character set is specified. |
| Numeric String | Number encoded as string. Can be signed or unsigned. Can be integer or floating type. Valid range(s) and/or floating point precision is specified. |
| Integer | Number binary encoded. Can be signed or unsigned. Valid ranges are specified. |
| Byte Array | Stream of binary bytes. Length is fixed or determined by specified terminator. |
| Bit Array | An array data structure which compactly stores individual bits (0 or 1) |

Referring to TABLE 1, and in this implementation, respective ones of well-formed data elements for input into software application 114 are modeled in fuzzing data schema 118, for example, as a corresponding character string, numeric string, integer, byte array, or bit array. A character string is a string of ASCII or Unicode characters of variable length. String length is fixed or determined by a specified terminator. In one implementation, a valid character set is specified. A numeric string is a number encoded as a string. Such a number (e.g., integer, binary coded number, floating point) is signed or unsigned. In one implementation, valid range relationships and/or precision attribute(s) is/are specified for a number. A byte array element is a stream of bytes. The length of the byte array is fixed or determined by a specified terminator. A bit array element is an array data structure which compactly stores individual bits (0 or 1).

TABLE 2

EXEMPLARY GROUPS TO DESCRIBE WELL-FORMED INPUT

| Name | Purpose |
|---|---|
| Sequential | Multiple elements or groups in a specified order are contained in a sequential group (a group can encapsulate other groups). |
| Single-Choice | Only one element or group out of specified list of elements or groups is contained in a single-choice group |
| Multi-Choice | Multiple elements or groups in any order are contained in a multi-choice group |

TABLE 2-continued

EXEMPLARY GROUPS TO DESCRIBE WELL-FORMED INPUT

| Name | Purpose |
|---|---|
| Bit Array Group | A list of binary bits of a certain length is contained in a bit array group |

Referring to TABLE 2, and in this implementation, groups in fuzzing data schema 118 include, for example, one or more sequential groups, single-choice groups, multi-choice groups, and bit array groups. A sequential group includes multiple elements or groups of element(s) in a specified order. For example, if software application 114 expects to receive element (field) "A", field "B", and field "C", in the specified order, schema would contain a sequential group with data fields (elements) A, B and C. A single-choice group represents only one element or group out of possible options. A multi-choice group represents multiple elements or groups in any order contained in the group. A bit array group is a list of bits contained in the group.

For example, and in one implementation, fuzzing data schema 118 describes a simple HTTP Message in XML as follows:

```
<SequentialGroup name="HTTP Message">
  <SequentialGroup name="Request Line">
    <String name="Method" TerminatedBy="SPACE"/>
    <String name="URI" TerminatedBy="SPACE"/>
    <String name="VERSION" TerminatedBy=
/>
  </SequentialGroup>
  <MultiChoiceGroup name="Headers">
    <SequentialGroup name="Header">
      <String name="Name" TerminatedBy=": "/>
      <String name="Value" TerminatedBy=
/>
    </SequentialGroup>
  </MultiChoiceGroup>
  <ConstString value=
/>
  <ByteArray name="body"/>
</SequentialGroup>
```

In the above example, "SPACE"=" ".

Valid Input Data Generation and Mutation to Generate Malformed Input

Fuzzing engine 112 parses fuzzing data schema 118 to create valid input data 120. Valid input data 120 represents data that conforms to respective elements in fuzzing data schema 118. Since fuzzing application models well-formed data for input into software application 114, valid input data 120 represents valid data for input into software application; data that software application 114 was designed to consume or process.

In one implementation, for example, fuzzing engine 112 randomly generates valid input data 120 by iterating through each group and element combination in fuzzing data schema 118, generating respective portions of valid input data according to the characteristics of the specific group type (e.g., sequential, single-choice, multiple-choice, etc) and element type (character string, numeric string, integer, length, valid range, etc.). For example, to generate valid input data 120 associated with a single choice group, one of the specified element(s) is randomly selected and created. In another example, fuzzing engine 112 generates a string element by iterating between zero (0) and a random length, within an allowed specified maximum indicated by element attributes/properties (e.g., valid range, minimum/maximum values, byte array length, etc.). For every character, a random character within an allowed specified set is generated.

After creating valid input data 120, and in one implementation, fuzzing engine 112 parses and mutates/changes valid input data 120 to generate malformed data 122 (properly formed invalid data) for input to and fuzz-testing of software application 114. To this end, fuzzing engine 112 parses valid input data 120 to generate a tree of groups and elements 124 and corresponding attributes (valid ranges, characteristics, etc) to representing the valid input data 120. Tree 124 isolates valid element data associated with respective individual elements of valid data 120 so that malformed data 122 can be generated from respective ones of the isolated elements.

For example an HTTP Message that would correspond to above schema would be:

```
GET /dir1/dir2/file.htm HTTP/1.0
HeaderA: valuea
HeaderB: valueb
Body
```

In this example, "GET" string corresponds to "Method" token, "HeaderA" and "HeaderB" correspond to "Header" sequential group and "Body" corresponds to "body" ByteArray.

Next, and in one implementation, fuzzing engine 112 applies one or more known fuzzing algorithms to at least a subset of the data elements in tree 124 to corrupt the data elements according to well-known data type based vulnerability patterns. For instance, one exemplary fuzzing algorithm inserts null values into string element(s). Another exemplary fuzzing algorithm, for example, may sets integer value(s) to a maximum value+1 in a specified allowable range, and/or so on. Fuzzing engine 112 further serializes the resulting mutated data tree (i.e., a data tree with fuzzed/corrupted data inputs), resulting in fuzzed data buffer 126 (or mutation template). Serialization is a common computer term for converting a data structure comprised of a few elements into a data buffer. For purposes of exemplary description, a mutation template is a sample of a legitimate data (e.g., please see the example of paragraph [0022]).

Exemplary Schema-Based Data Fuzzing

In one implementation, fuzzing engine 112 provides at least a subset of malformed data 122 to software application 114 to test and validate portions of software application 114 for security vulnerabilities. To this end, and in one implementation, fuzzing engine 112 interfaces with an Application Programming Interface (API) 128 exposed by a software application 114 to input respective portions of malformed data 122 into software application 114. For instance, if software application is an SMTP application, fuzzing engine 112 sends fuzzed data (respective portions of malformed data 122) to the SMTP application. In another implementation, fuzzing engine 112 interfaces with an Application Programming Interface (API) 128 exposed by a testing tool application independent of fuzzing engine 112 to provide malformed data 122 to the testing tool. In this scenario, the testing tool communicates received malformed data 122 to fuzz-test software application 114. For purposes of exemplary illustration, an exemplary such testing tool is shown as a respective portion of "other program modules" 116. In yet another implementation, fuzzing engine 112 provides malformed data 122 to software application 114 by generating a data file for parsing by the testing tool. For purposes of exemplary illustration, such a data file is shown as a respective portion of "other program data" 130.

Responsive to receiving a piece of malformed data 122, if software application 114 crashes (or otherwise performs contrary to target design), the testing operations based on schema-based fuzzing have identified a security vulnerability in a code portion of software application 114 corresponding to the received piece of malformed data 122. Otherwise, if no crash (or other unusual behavior) of software application 114 occurs, no security vulnerability was identified in the corresponding portion of code (i.e., the code portion is validated). Because malformed data 122 is systematically generated according to modeled format of well-formed input data to the software application, false positives for security vulnerabilities are not generated when malformed data 122 is input into software application 114.

Exemplary Procedure

Figure 2:
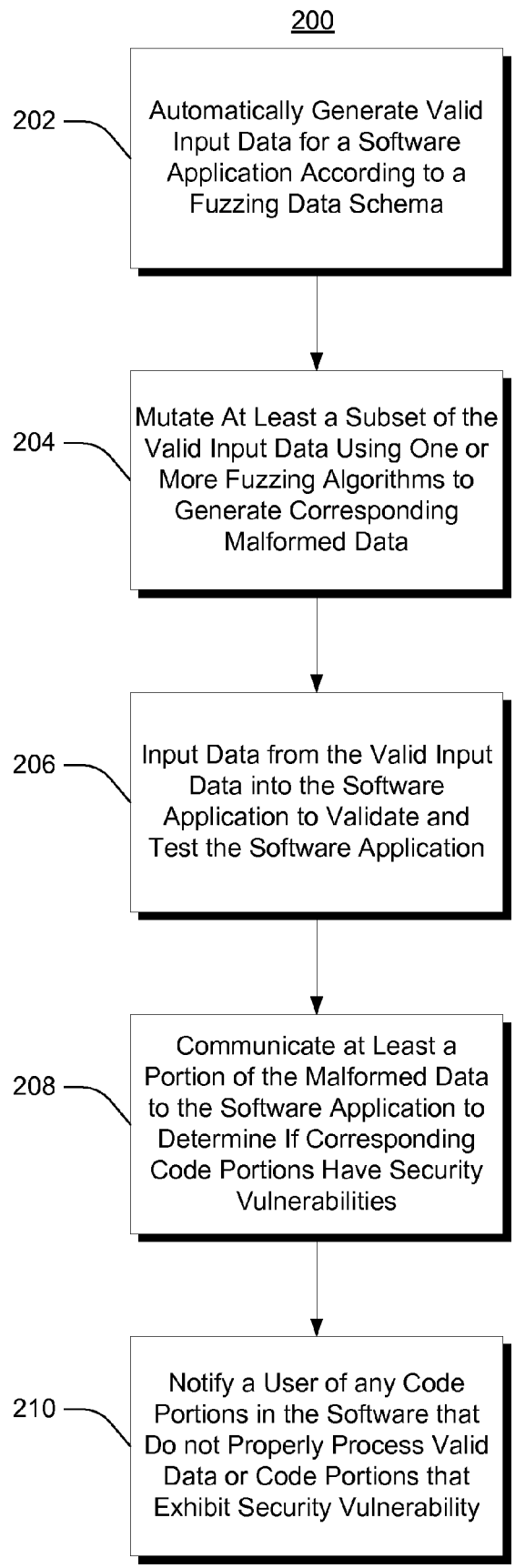
FIG. 2 shows an exemplary procedure to test software applications with schema-based fuzzing, according to one embodiment.

FIG. 2 shows an exemplary procedure 200 for testing software applications with schema-based fuzzing, according to one implementation. For purposes of exemplary illustration and description, operations of procedure 200 are described with respect to aspects of FIG. 1. In the description, the left-most numeral of a component reference number indicates the particular figure where the component was first introduced. In one implementation, operations of procedure 200 are implemented by respective program modules 108 of computing device 102 of FIG. 1 and/or computer-program modules of remote computing device 134.

Referring to FIG. 2, operations of block 202 automatically generate valid input data 120 (FIG. 1) for software application 114. The valid input data 120 is generated according to well-formed data characteristics described in a fuzzing data schema 118. Operations of block 204 mutate at least a subset of the valid input data 120 using one or more well-known fuzzing algorithms to generate corresponding malformed data 122. Operations of block 206, in one embodiment, input data from the valid input data 120 into the software application 114 to validate and test the software application. Operations associated with block 206 provide an additional avenue for test validation of the software application independent of fuzz testing the software application with malformed data 122. For instance, these operations validate whether the software application properly operates responsive to receiving properly formed data.

Operations of block 208 communicate at least a portion of the malformed data 122 to the software application 114 to determine if corresponding code portions of the software application exhibit security vulnerability. Operations of block 210, notify a user of any code portions in the software application 114 that do not properly process respective portions of valid input data 120, as identified via the valid input data testing of block 204. Operations of block 200 can also notify user of any code portions in the software application 114 that have security vulnerability, as identified via the fuzz testing of block 206. In one implementation, such notification is via a message or dialog box presented to a user using a display device 138.

Figure 3:
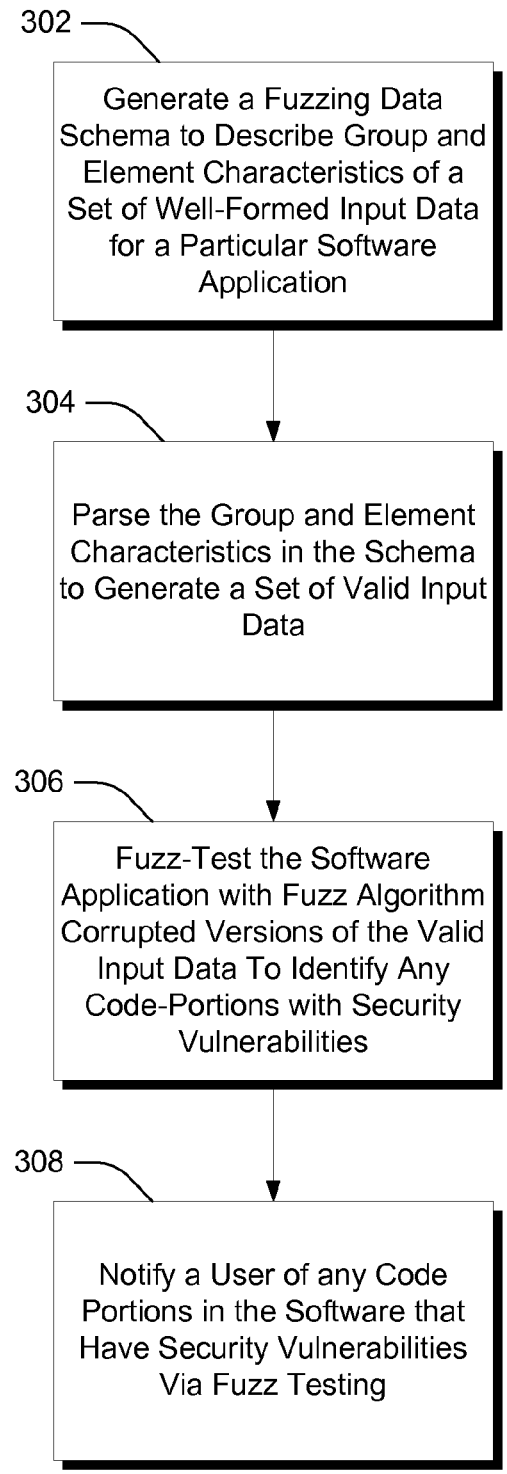
FIG. 3 shows an exemplary procedure that generates a fuzzing data schema to test software applications with schema-based fuzzing, according to one embodiment.

FIG. 3 shows another exemplary procedure to test software applications with schema-based fuzzing, according to one embodiment. For purposes of exemplary illustration and description, operations of procedure 300 are described with respect to aspects of FIG. 1. In the description, the left-most numeral of a component reference number indicates the particular figure where the component was first introduced. In one implementation, operations of procedure 300 are implemented by respective program modules 108 of computing device 102 of FIG. 1 and/or computer-program modules of remote computing device 134.

Operations of block 302 generate a fuzzing data schema 118 (FIG. 1) to describe group and element characteristics of a set of well-formed input data for a particular software application 114. Operations of block 304 parse the group and element characteristics and the fuzzing data schema 118 to generate a set of valid input data 120. Operations of block 306 fuzz-test software application 114 with fuzzing algorithm-corrupted versions of the valid input data 120. System 100 implements this fuzz testing to identify any code-portions of the software application 114 with security vulnerability. In this implementation, the corrupted versions of the valid input data 120 are shown as malformed data 122. Operations of block 308 notify a user of any code portions of the software application that have security vulnerabilities identified via the fuzz testing operations.

Alternate Embodiments

Although system 100 of FIG. 1 has been described as using valid input data 120 (generated from fuzzing data schema 118) merely to generate structure and content associated with malformed data 122, in another implementation valid input data 120 is used for additional purposes. For example, in one implementation, valid input data 120 is utilized to test proper functionality and/or results of software application 114 (this is as compared to utilizing malformed data 122 to identify code portions of software application 114 with security vulnerability). For purposes of exemplary illustration, a testing tool, shown as respective portion of "other program data" 116, inputs data from valid input data 120 into software application 114 to test operations of software application 114.

For example, in one embodiment, valid input data 120 specifies content of one or more messages for communication to the software application 114 according to a specific protocol described by the fuzzing data schema 118. In this embodiment, the testing tool communicates at least a subset of the messages to the software application 114 to validate whether the software application properly processes the received messages. This is only one arbitrary example of using a particular exemplary aspect of valid input data 120 to test proper functioning of software application 114. There are many different scenarios where different types of valid input data 120 are used to test operations of software application 112.

In another example of an alternative embodiment, although FIG. 1 shows computing device 102 as a stand-alone device, in one implementation, computing device 102 is coupled across communications network 132 to a remote computing device 134. In this implementation, computing device 102 communicates fuzzed data buffer 126 across network 132 to remote computing device 134 to test a software application at remote computing device 134 for security vulnerabilities. In another example, rather than fuzzing engine 112 directly generating valid input data 120 directly from fuzzing data schema 118, in another implementation valid input data 120 is determined using network capture, or by manually generating the valid input data 120. In either of these latter two scenarios, fuzzing engine 112 generates fuzzed data buffer 126 and malformed data 122 based on valid input data 120. Techniques to collect input data via network capture are well-known, for example this can be done using network sniffer.

Conclusion

Although the above sections describe testing software applications with schema-based fuzzing in language specific to structural features and/or methodological operations or actions, the implementations defined in the appended claims are not necessarily limited to the specific features or actions described. Rather, the specific features and operations to test software applications with schema-based fuzzing are disclosed as exemplary forms of implementing the claimed subject matter.

The invention claimed is:

1. A method at least partially implemented by a computing device, the method comprising:
 automatically generating, by the computing device, valid input data for a software application according to a schema that represents decomposing input data into atomic groups including: groups of groups, groups of elements, and groups of primitive elements; the groups, elements, and primitive elements representing components of a markup language, the valid input data being well-formed for input into the software application;
 generating a random character for each member of the groups of groups, groups of elements, and groups of primitive elements; and
 fuzz-testing the software application with corrupted versions of the valid input data, the fuzz-testing identifying any security vulnerabilities associated with the software application independent of any false positive security vulnerability indications.

2. The method of claim 1, wherein the elements comprise one or more of a string, a numeric string, an integer, a byte array, and a bit array, each element of at least a subset of the elements being associated with at least one attribute to indicate appropriate value(s) of the element for well-formed input into the software application.

3. The method of claim 2, wherein the groups comprise one or more of a sequential group, a single-choice group, a multiple-choice group, and a bit array group, the sequential group to represent one or more of multiple elements and multiple groups in a well-specified order, the single-choice group to characterize only one element or group from a corresponding list of elements or groups, the multiple-choice group to indicate one or more of multiple elements and multiple groups in any order, the bit array group being designed to indicate an array of bits.

4. The method of claim 1, further comprising mutating, using one or more fuzzing algorithms, at least a subset of the valid input data in view of any associated attribute information to generate corresponding malformed data, the malformed data being the corrupted versions.

5. The method of claim 1, further comprising providing at least a subset of the malformed data to the software application to determine if corresponding portions of computer-program code have security vulnerability.

6. The method of claim 1, further comprising providing at least a subset of valid input data to test and validate the software application.

7. A tangible computer-readable data storage medium comprising computer-program instructions executable by a processor, the computer-program instructions, when executed by the processor, for performing operations comprising:
 describing, in a schema, characteristics of a set of well-formed input data for a particular software application, the characteristics including groups and elements representing components of a markup language;
 parsing the schema to evaluate the characteristics and randomly generate, based on the characteristics, a set of valid input data for the particular software application, wherein the generating comprises iterating through each combination of the groups and elements described in the schema, and generating a random character for each combination;
 fuzz-testing the software application with corrupted versions of the valid input data, the fuzz-testing identifying any code-portions in the particular software application with security vulnerabilities.

8. The tangible computer-readable medium of claim 7, wherein the corrupted versions were generated with one or more fuzzing algorithms that exploded corresponding data type vulnerability pattern(s).

9. The tangible computer-readable medium of claim 7, wherein the fuzz-testing is independent of any possibility for a false positive security vulnerability indication.

10. The tangible computer-readable medium of claim 7, wherein describing further comprises modeling a datum of the well-formed input data with an element, the element describing at least data type of the element.

11. The tangible computer-readable medium of claim 7, wherein describing further comprises modeling a datum of the well formed input data with an element, the element describing a data type of the element and valid characteristics of the element, the valid characteristics indicating a set of legitimate variations of the element, each legitimate variation representing a respective valid input into the particular software application.

12. The tangible computer-readable medium of claim 7, wherein describing further comprises modeling the well-formed input data with one or more of groups of elements and groups of groups of elements, at least a subset of the groups indicating one or more characteristics of a well specified group or element ordering, a single group or element choice, a multiple group or element choice independent of order, and a list of bits, the valid input data being generated based on the characteristics.

13. The tangible computer-readable medium of claim 7, wherein parsing further comprises:
 identifying groups and elements describing valid characteristics of the well-formed input data, and
 wherein the method further comprises:
 automatically creating the valid input data based on the valid characteristics.

14. The tangible computer-readable medium of claim 13, wherein data of the valid input data are generated from a single element of the elements, the single element being associated with valid characteristics that identify a range of valid values or lengths, each datum of the data representing a particular one value of the range or length of the lengths.

15. The tangible computer-readable medium of claim 7, wherein fuzz-testing further comprises:
 communicating the corrupted versions of the valid input data to the particular software application;
 monitoring execution characteristics of the particular software application to determine if behavior of the software application deviates from an expected behavior responsive to receiving particular one(s) of the corrupted versions; and
 if the behavior deviates from the expected behavior, indicating to a user that a code portion of the particular software application is vulnerable to malformed data, the code portion for processing the particular one(s) of the corrupted versions.

16. The tangible computer-readable medium of claim 15, wherein the communicating is via a tree of isolated data inputs, and wherein the computer-program instructions further comprise instructions for:

serially sending respective ones of the isolated data inputs to a corresponding application program interface exposed by the software application to test corresponding code portions of the software application for security vulnerabilities.

17. A computing device comprising:

a processor; and a memory coupled to the processor, the memory comprising computer-program instructions executable by the processor for performing operations comprising:

randomly generating a set of valid input data by iterating through each member of groups and elements in combinations, the groups and elements decomposed from valid data according to a user-defined fuzzing data schema, the groups and elements representing components of a markup language;

mutating the set of valid input data to generate a corresponding set of invalid input data, the valid input data being generated from the groups and elements described in the fuzzing data schema, the groups and elements describing the characteristics of well-formed data for a particular software application;

providing the invalid input data to the particular software application or to an intermediate testing tool to fuzz-test the particular software application for security vulnerabilities.

18. The computing device of claim 17 wherein each datum of the valid input data is not randomly generated in that the datum is based on well-specified characteristics described in the fuzzing data schema as being proper for input into the particular software application.

19. The computing device of claim 17, wherein the fuzzing data schema further comprises information describing a protocol of communication and corresponding message formats for communicating with the particular software application.

* * * * *